Figure 1:
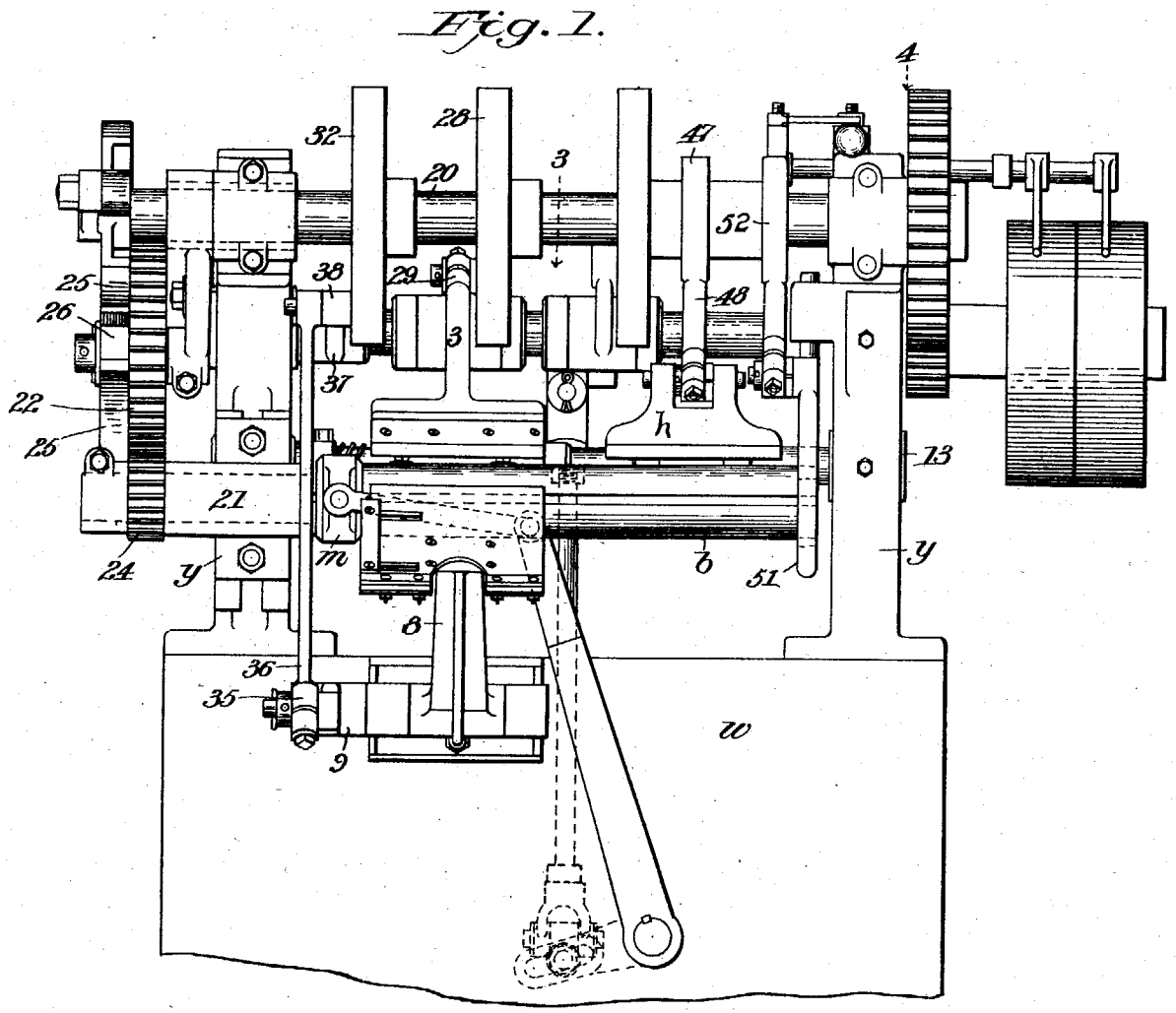

No. 12,375. REISSUED AUG. 1, 1905.

J. ELDRIDGE.

CAN MAKING MACHINE.

APPLICATION FILED OCT. 8, 1904.

5 SHEETS—SHEET 1.

WITNESSES:

C. H. Wacker.

T. W. Fowler

INVENTOR

John Eldridge

BY

Geo. H. Strong

Attorney

ANDREW B. GRAHAM CO., PHOTO-LITHOGRAPHERS, WASHINGTON, D. C.

No. 12,375. REISSUED AUG. 1, 1905.

J. ELDRIDGE.

CAN MAKING MACHINE.

APPLICATION FILED OCT. 8, 1904.

5 SHEETS—SHEET 2.

WITNESSES:

C. N. Walker

T. W. Fowler

INVENTOR

John Eldridge

BY Geo. H. Strong

Attorney

ANDREW B. GRAHAM CO., PHOTO-LITHOGRAPHERS, WASHINGTON, D. C.

No. 12,375. REISSUED AUG. 1, 1905.

J. ELDRIDGE.

CAN MAKING MACHINE.

APPLICATION FILED OCT. 8, 1904.

5 SHEETS—SHEET 3.

WITNESSES:

C. M. Walker.

T. W. Fowler

INVENTOR.

John Eldridge

BY

Geo. H. Strong

Attorney

ANDREW B. GRAHAM CO., PHOTO-LITHOGRAPHERS, WASHINGTON, D. C.

No. 12,375. REISSUED AUG. 1, 1905.

J. ELDRIDGE.

CAN MAKING MACHINE.

APPLICATION FILED OCT. 8, 1904.

5 SHEETS—SHEET 4.

WITNESSES:

C. H. Walker

T. W. Fowler

INVENTOR

John Eldridge

BY

Geo. H. Strong

Attorney

ANDREW B. GRAHAM CO., PHOTO-LITHOGRAPHERS, WASHINGTON, D. C.

No. 12,375. REISSUED AUG. 1, 1905.

J. ELDRIDGE.

CAN MAKING MACHINE.

APPLICATION FILED OCT. 8, 1904.

5 SHEETS—SHEET 5.

WITNESSES:

C. H. Walker.

T. W. Fowler

INVENTOR

John Eldridge

BY

Geo. H. Strong,

Attorney

ANDREW B. GRIMAM CO., PHOTO-LITHOGRAPHERS, WASHINGTON, D. C.

UNITED STATES PATENT OFFICE.

JOHN ELDRIDGE, OF ASTORIA, OREGON, ASSIGNOR OF ONE-THIRD TO PETER KRUSE AND ONE-THIRD TO CHARLES MICHELSEN, OF SAN FRANCISCO, CALIFORNIA.

CAN-MAKING MACHINE.

No. 12,375. Specification of Reissued Letters Patent. Reissued Aug. 1, 1905.

Original No. 712,998, dated November 4, 1902. Application for reissue filed October 8, 1904. Serial No. 227,761.

*To all whom it may concern:*

Be it known that I, JOHN ELDRIDGE, a citizen of the United States, formerly a resident of the city and county of San Francisco, State of California, now domiciled at Astoria, county of Clatsop, State of Oregon, have invented new and useful Improvements in Can-Making Machines, of which the following is a specification.

This invention relates to improvements made in machines for bending a sheet-metal blank and joining the edges by an interlocked joint ready for soldering in the manufacture of sheet-metal cans.

The invention comprises certain novel parts and combination of parts, producing an improved can-body-making machine; and the improvements embrace a construction and combination of horn or cylindrical former having rotative movement in the same direction and a hook-forming device operating in conjunction with the horn to form oppositely-turned hooks on both edges of the blank during the intervals of rest before and after each rotative movement and to interlock the hooks; also, novel means for presenting and controlling the blank; also, a novel construction of hook-forming device on the horn operating in conjunction with a reciprocating blade to form one hook on the leading edge of the blank and attach it to the horn at the same operation and afterward to form the second hook on the opposite edge after the blank is brought to cylindrical form by the rotation of the horn, in which operation the two hooks are formed in proper position or relation to each other to interlock by a longitudinal movement of the wrapped blank on the horn; also, novel means for presenting and controlling the blank, all as hereinafter fully described, and pointed out in the claims at the end of this specification.

Figure 2:
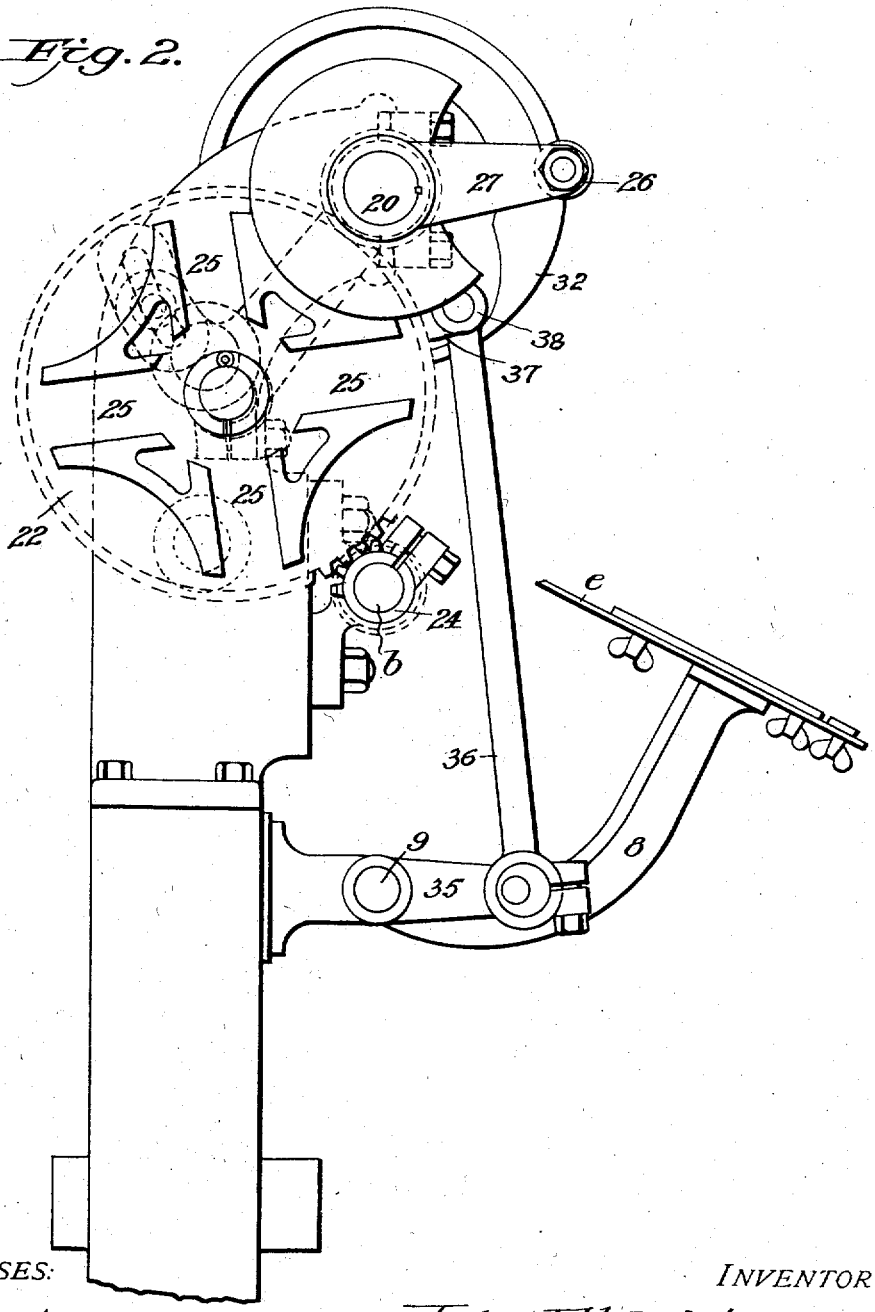
Figure 3:
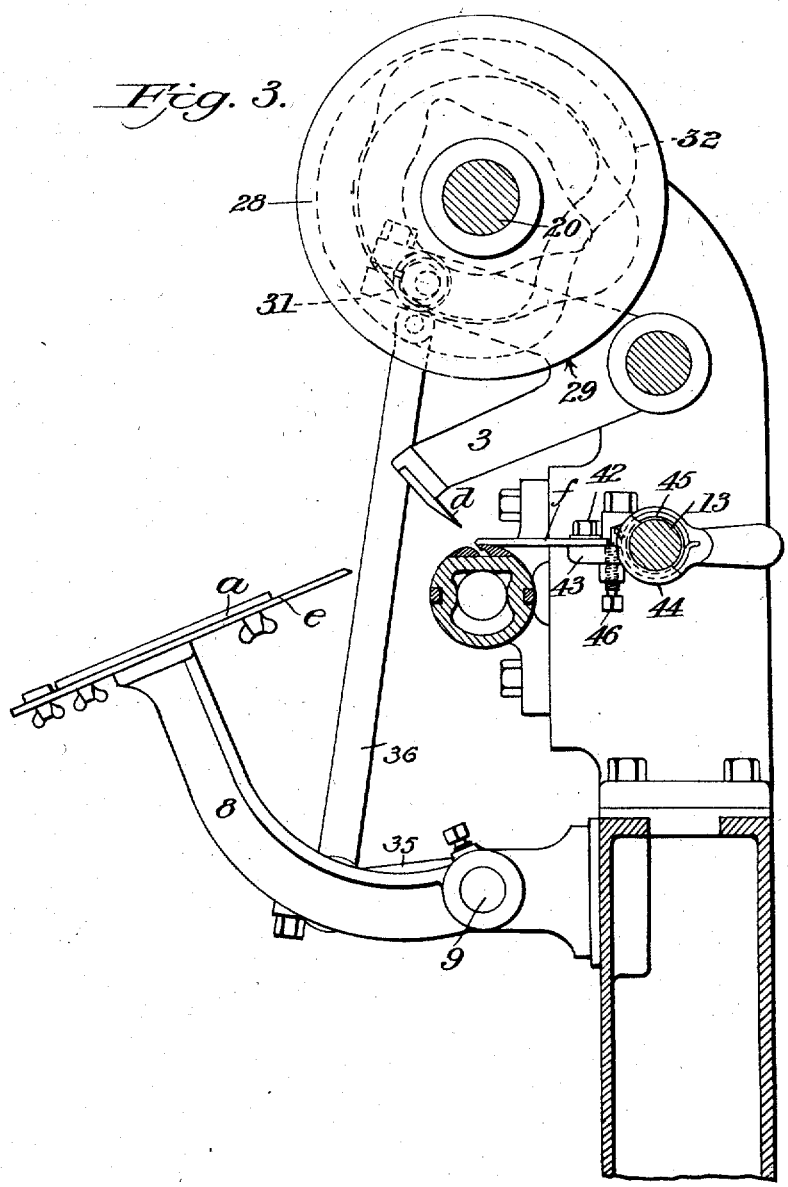
Figure 4:
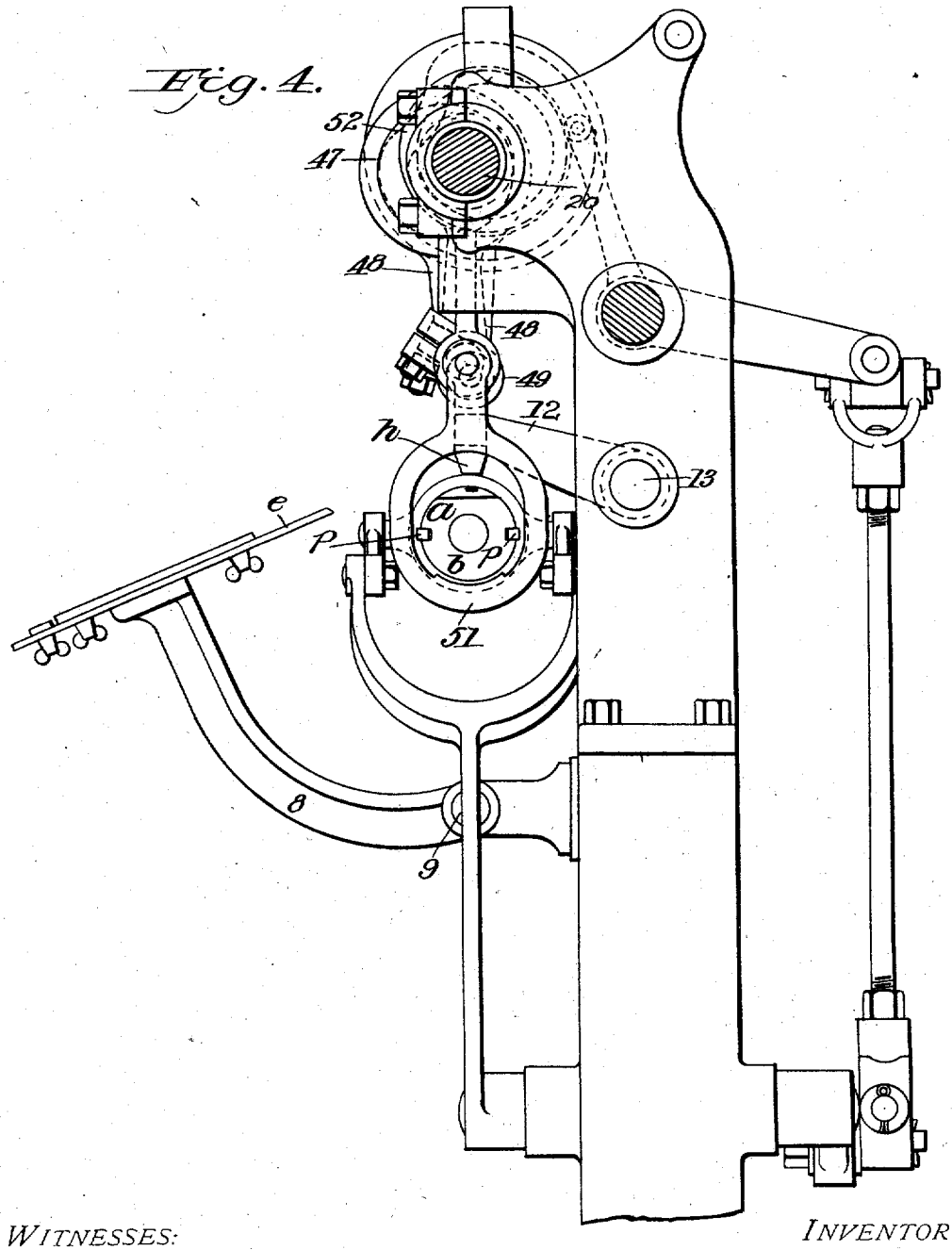
Figure 5:
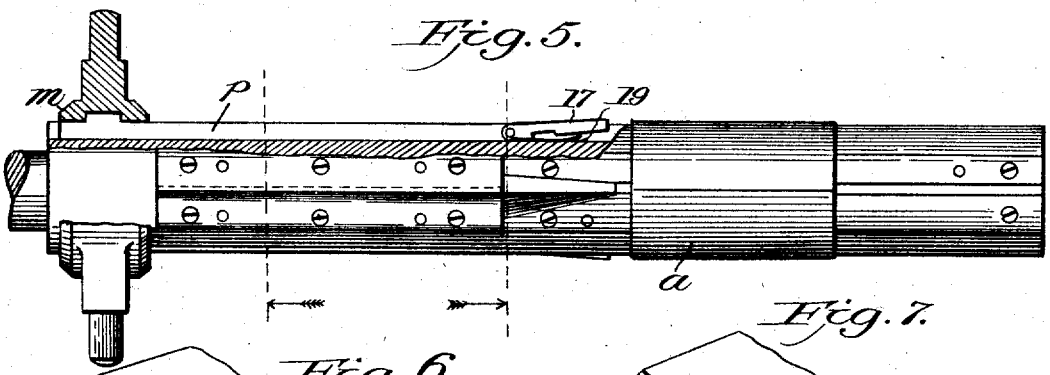
Figure 6:
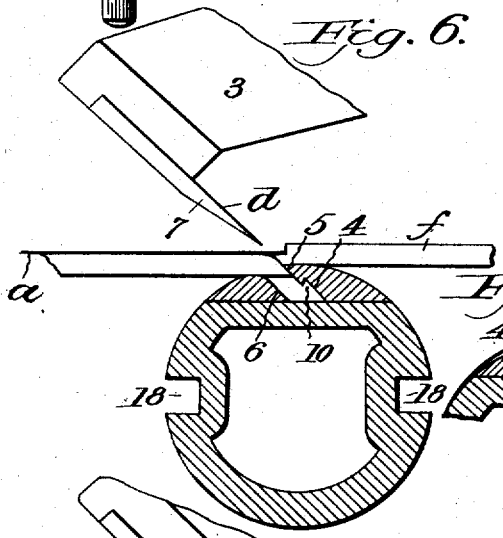
Figure 7:
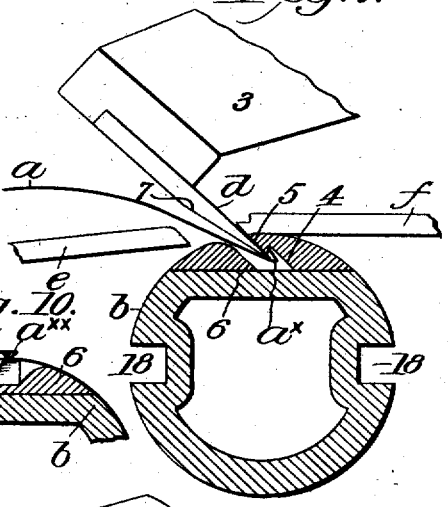
Figure 10:
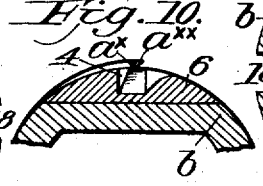
Figure 8:
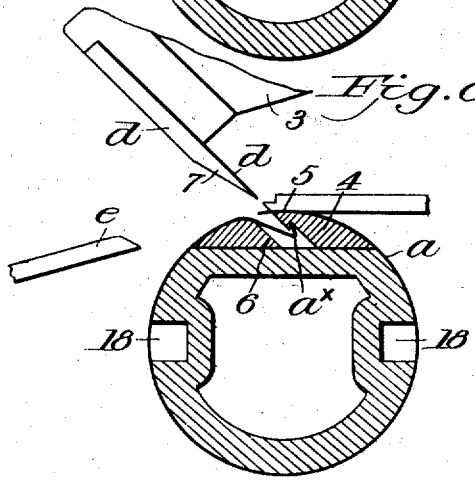
Figure 9:
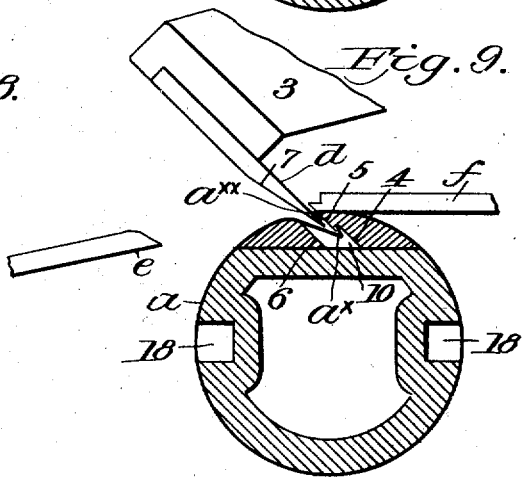

The accompanying drawings herein referred to represent, in Figure 1, a front elevation of a can-body machine embodying this invention; in Fig. 2, an elevation taken from the left side of Fig. 1; in Fig. 3, a transverse section on the line 3, Fig. 1; and in Fig. 4, a similar section on the line 4, Fig. 1. Fig. 5 is a front view, partly in section and on an enlarged scale, of the rotatable former and the ejecting device. Figs. 6, 7, 8, 9, and 10 are views, partly diagrammatic and on an enlarged scale, of the hook-forming devices, illustrating consecutive steps or stages in the operation, wherein the hooks are formed on the meeting edges of the body-blank and are interlocked to produce the well-known locked seam or joint, Figs. 6 and 7 illustrating the operation of forming the fold or hook on the first or leading edge of the blank and Figs. 8 and 9 showing the operation of forming the hook on the opposite edge of the blank.

In this machine the horn or mandrel on which the can-body blank is brought to the required cylindrical form is rotated always in one direction, with intervals of rest, during which the hooks or angular folds on the edges of the blank are formed and interlocked. The blank *a* is attached to the horn *b* by the hook formed on the leading edge of the blank, and then by a complete revolution of the horn the blank is wrapped around the horn and brought to a circular form, after which while the horn is held at rest the second hook is formed on the blank, and finally the two edges are interlocked by sliding the wrapped blank longitudinally upon the horn. This movement of the horn carrying the blank away from the hook-forming devices brings the blank in position under a presser or hammer that operates to force the hooks closely together and produces a tight joint ready for soldering. Both hooks are formed by the same mechanism; but one hook is bent or turned in the opposite direction to the other, with the first-formed hook underlying the hook last formed and also bent to engage with the last-formed and overlying hook. The two hooks are consequently in proper position to interlock as soon as formed, and the edges of the blank are united by a short movement of the blank longitudinally on the horn without requiring a special mechanism to bring the hooks together.

The principal parts or features of the present machine embodying my invention comprise a revoluble horn *b*, having a groove or channel 4 of peculiar form and position, a reciprocating folding-tool *d*, operating in conjunction with the horn *b* and forming a hook on the blank as the edges of the latter are presented in succession and at the beginning and the end of the revolution of the horn, and a blank-feeding device that presents the edge of the blank between the folding-tool and the mandrel.

The horn *b* rotates always in the same direction, and starting from a state of rest, during which the leading edge of the blank is presented and brought under the folding-tool, the horn makes a complete revolution before coming to rest again. The folding-tool is a blade *d* on the end of an arm 3, having oscillating or reciprocating movement in a vertical arc from a pivotal point which is situated behind and above the top line of the horn, so as to carry the blade in a vertical arc and its acting edge parallel with the longitudinal axis of the horn.

On that line along the upper surface of the horn where the edge of the blade would strike if allowed to come in contact a groove or channel 4 is formed in the face of the horn parallel with the axis of rotation of the horn, but also inclined with relation to the surface of the horn, so that the blade entering this groove or channel passes under the upper edge or wall of the groove and its top edge or wall 5 at such time overhangs the edge of the folding device. The front side 7 of the blade *d* is beveled to about the same angle as the slanting front side 6 of the groove 4.

The blank-feeding device consists of a table formed of a flat plate *e* on the end of an oscillating arm 8, having movement from a center of oscillation 9, situated below the line of the horn. From that point moving in a vertical arc the table rocks intermittently and in proper time with relation to the movements of the folding-blade to bring the leading edge of the blank over the groove in the horn and hold the blank in position until the folding-blade moving downward strikes the blank. In such feeding movement of the table the forward edge of the blank is laid over or beyond the rear edge of the groove 4 an amount or distance sufficient to furnish the proper width of metal for the horn, and while the table holds the blank in that position with its edge against the rear edge 5 of the groove the edge of the blade descending strikes the blank from above and just back of the edge. The downstroke of the blade also carries the upturned edge of the fold below the line of an undercut recess 10, formed in the overhanging wall of the groove and the hook previously formed by the downstroke of the blade catches in and is held by the recess 10 as the blade recedes from the groove and is drawn away from the horn. The leading edge of the blank is attached to the horn by the hook $a^{\times}$, thus formed in the channel by a single stroke of the folding-blade. In the downstroke of the folding-blade as soon as the edge of the blank is caught by the blade the feeding-table moves back from beneath the blank and returns to position for another blank.

The position of the blank on the feed-table and the amount or extent of metal required to form the angular bend or hook on the edge of the blank are determined and regulated by a gage-plate *f*, situated over and in close relation to the top face of the horn. This gage has a fixed position with respect to the groove in the horn where the mechanism is constructed to form one size of hook or fold on the edge of the blank; but where it is desired to vary the size of the fold to increase or diminish the width of the overlapping portion the gage-board *f* is adjustable forward and backward with relation to the acting edge of the groove in the horn and is provided with means for retaining it in position after adjustment. The same parts coacting, as before described, to form the first hook $a^{\times}$ in the leading edge of the blank also form the remaining hook $a^{\times\times}$ on the opposite edge; but in the last-named operation the blank is so positioned by the rotation of the horn and at the end of its complete revolution that the rear edge of the blank hangs over and extends beyond or in front of the rear edge of the groove in the horn the proper distance to form the remaining fold of the desired width. In this second operation the gage-board confines or holds down the rear edge of the blank, while the folding-blade makes a second downstroke and bends the edge of the sheet over the edge of the groove. In this position it will be noticed that the rear edge of the sheet of metal is presented to the action of the folding-blade in such manner that the fold in the metal is the reverse of the first-formed fold on the opposite edge, and the hook thus formed is turned toward the one first formed and held in the groove. The two hooks are consequently in position to engage and interlock when the under one is brought toward the upper one. This first operation to complete the interlocking is accomplished by reducing the depth of the groove 4 in the horn for the remainder of the distance from that part where the blanks are wrapped, and the hooks are formed out to the end of the horn, from which the finished blank is discharged. In that portion of the horn which is directly under the folding device the groove is of uniform depth to provide sufficient space for forming the hooks; but for the remainder of the groove it decreases quite rapidly until the depth practically corresponds to the thickness of the interlocked seam of the can-body. In this shallow portion of the groove the final operation takes place to close the seam before the can-body is discharged from the end of the horn, and over this part of the groove is situated the compressing-tool. That part or device consists of a head *h* on the end of a rocking arm 12, having movement in an arc from a center of movement on a shaft 13 behind the horn. It is operated intermittently in the periods of rest of the horn when the hooks are being formed.

The ejecting device to move the body-blank from its first position under the hook-forming blade to its second position under the compressing-tool *h* consists principally of a slide-ring *m* on the horn, movable longitudinally from a position on the left side of the body-blank outward toward the end of the horn, with a length of stroke sufficient to set the blank clear of the folding-blade and under the compressing-tool. From that position the ejector is returned to the left again before the next blank is fed. In addition to this function the ejector operates to discharge the finished can-body from the end of the horn, and for that purpose it is provided with several narrow bars *p*, fitted to slide longitudinally in grooves 18 in the horn and attached at the inner ends to the slide-ring, so as to move with the ring. The outer ends of the bars carry hinged fingers 17, that are thrown out by springs 19, interposed between the backs of the grooves 18 and the fingers, and their outer ends stand slightly above the cylindrical surface of the horn, but are also readily depressed to lie within the grooves. These bars *p* are so proportioned in length to the stroke of the ring *m* and the position which the blank occupies under the compressing-tool that the first-positioned blank which is brought to place under the compressor is left under the compressing-tool, while the slide returns to the left side of the feed-table beyond the hook-forming blade before the next blank is feed in; but in the following movement the slide *m* brings the next wrapped blank away from the hook-forming blade and under the compressing-tool and at the same time discharges the previously formed and interlocked blank by virtue of the projecting fingers *p* engaging the end of that blank. Every longitudinal movement of the ejector to the left forces one can-body off the horn as it brings the next one into position to be acted on by the compressing-tool. In this operation the ejecting-bars are drawn through the last-set blank on the return movement of the slide, so as to bring the projecting-fingers in position to the left side of the blank, which is then lying under the compressing-tool. In this movement the fingers recede into the grooves in the horn and slide through the inside of the blank without catching. These parts are arranged and combined with parts and mechanism in an organized machine, as shown in the drawings, in which the blanks are presented to the hook-forming blade and are brought to a cylindrical shape, with their edges interlocked and compressed, and are finally discharged from the machine, all in an automatic and continuous manner.

In the drawings, *w* represents the base of the machine, and *y y* the upright side frames, furnishing supports and bearings for the various working parts. 20 is the principal shaft, and 21 a long bearing supporting one end of the rotary horn *b*.

The intermittent rotation of the horn is produced from the continuously-driven shaft 20 by a "stop-motion" of any proper construction having such adjustment that the required interval of rest, followed by a complete rotation, is imparted to the horn in time with the reciprocating movements of the blank-feeding and edge-folding devices. The character of stop-motion mechanism represented in the drawings is substantially the same as the well-known "Geneva" stop-motion, comprising a spur-wheel 22, engaging a pinion 24, fast on the end of the horn and having intersecting grooves 25 25 on the outer face, with which a roller-stud 26 on the end of an arm 27, carried by the principal shaft 20, is caused to engage and pass through as the shaft is rotated. The radius of the traveling arm and the distance on the circumference between the grooves are so proportioned that in passing in and out of one groove after another the end of the arm traveling in a circle will turn the wheel one-fourth of a complete revolution in every complete rotation of the principal shaft, and according to the proportion of the pinion to the spur-wheel the rotations of the horn are timed to operate with the other working parts, as described.

The hook-forming device is actuated from the shaft 20 by means of a grooved cam 28, through an arm 29, extending from the rocking arm 3 of the hook-forming blade and having a roller-stud 31 on the end. From a cam 32 on the same shaft the blank-feeding table is intermittently reciprocated through a rock-shaft 9, carrying the arm 8, on which the blank-feeding table is mounted, an arm 35 on the rock-shaft, and a connecting-rod 36 between that arm and a rocking arm 37 above, the outer end of which carries a roller-stud 38, working in the groove of the cam 32.

A fixed shaft 13, extending across the frame behind and parallel with the rotary horn, furnishes a support both for the rocking arm 12 of the compressing-tool *h* and for the gage-plate *f*. The last-mentioned member of the blank-forming mechanism is adjustably secured by set-screws 42 to a bracket-piece 43 on the front of a sleeve 44, that is fitted on the shaft 13.

A coiled spring 45, attached at one end to the sleeve and at the other end to a fixed point, holds the outer end of the gage-plate against the top face of the horn with a yielding pressure, and a stop-screw 46 regulates the distance or clearance between the face of the hook-forming blade and the gage-plate.

The means for operating the compressing-tool consists of an eccentric 47 on the principal shaft and an eccentric-rod 48, connected at the lower end to the top of the compressor by a knuckle-joint 49 and attached at the upper end to the eccentric-strap, the parts being properly adjusted and timed to operate the head with a downward thrust against the top face of the horn when the locked edges are brought in position under the tool.

The end of the horn from which the body-blank is discharged is supported by a stirrup 51, having an oblong opening sufficiently larger than the dimensions of the horn to permit the can-body to slip off between the horn and the stirrup when the latter is dropped. A short vertical movement of the stirrup for that purpose is produced by an eccentric 52 on the principal shaft through an eccentric-strap and its rod.

Having thus described my invention, what I claim, and desire to secure by Letters Patent, is—

1. In a can-body-forming mechanism, a rotatable horn having a longitudinal groove in its face with an inclined overhanging side, in combination with a blank-feeding device, a gage-plate, a reciprocating hook-forming device, and an undercut recess in the overhanging side of the groove adapted to engage the hook formed on the leading edge of the blank and attach the same to the horn.

2. In a can-body-forming mechanism, an intermittently-rotatable horn, having a longitudinal groove with an overhanging top edge along one side and an undercut recess below the top edge, in combination with a blank-feeding device, a gage-plate, and a reciprocating edge-folding device operating by one movement to form an upwardly-turned hook on the leading edge of the blank, and leave the hook so formed in a position to engage the undercut recess in the groove, and operating by a second movement to form a downwardly-turned hook on the remaining edge of the blank.

3. In a can-body-forming mechanism, an intermittently-rotatable horn having a longitudinal groove with an inclined overhanging side and an undercut recess, said groove being of equal depth and width on that portion of the horn on which the blank is wrapped, and decreased in depth for the remaining portion of its length, in combination with a blank-feeding device, a gage-plate, a reciprocating hook-forming device, means actuating said hook-forming device during the interval of rest in the movement of the horn in advance of and following each rotative movement, and a reciprocating ejecting device movable longitudinally on the horn, and adapted to move the blank in the direction of the decrease in the depth of the channel.

4. The combination with a rotatable can-body horn having a groove of uniform depth for the full length of the can-body blank and a portion of decreasing depth and width, said groove having inclined sides and an undercut recess in the overhanging side; of a blank-feeding device, and a hook-forming device operating to form an upwardly-turned hook on the leading edge of the blank and press the same into the groove below the undercut recess, whereby the blank is attached to the horn by the formed hook to be wrapped by the rotation of the horn.

5. The combination, with a can-body horn having a longitudinal groove of varying depth as described, with inclined sides and an undercut recess in the overhanging side thereof; of means for intermittently rotating the horn, a blank-feeding device, a gage-plate operating in conjunction with the blank-feeding device to hold the edge of the blank over the channel, and a reciprocating hook-forming device operating to form oppositely-turned hooks on both edges of the blank in a successive manner between the rotative movements of the horn, a seam-pressing device and means for sliding the wrapped and interlocked blank on the horn from beneath the hook-forming device and presenting it to the pressing device.

6. The combination, with an intermittently-rotating can-body horn having a longitudinal groove with an overhanging side and an undercut recess below the top edge of that side; of a reciprocating hook-forming device consisting of a reciprocating blade, and means operating the said blade in the intervals between the rotative movement of the horn to form an upwardly-turned hook on the first-presented edge of the blank and bring the hook in position to engage the undercut recess in the groove, and afterward to form a downwardly-turned hook on the opposite edge of the blank and over the first-formed hook.

7. In a can-body-forming mechanism, a recessed rotatable horn, means for feeding sheets of metal tangentially to said horn, and a folding-blade reciprocal to and from the periphery of the horn whereby the edges of the sheet are bent to interlock.

8. In a can-body-forming mechanism, a recessed rotatable horn, means for feeding metal sheets with the front and rear edges successively registering with the recess, a blade and means to reciprocate said blade in unison with the presentation of each edge of the sheet whereby said edges are successively folded preparatory to their interlocking.

9. In a can-body-forming mechanism, a rotatable horn having a peripheral die-recess, means for presenting blanks in juxtaposition to said recess, means coöperating with the horn to engage the presented edge of the blank in said recess and to form a hook member along said edge, means for rotating the horn, and means for operating said first-named hook-forming means coördinately with the movement of the horn to form an interlocking hook member on the opposite edge of said blank.

10. In a can-body-forming mechanism, the combination with a rotatable horn, of means for presenting the edge of a blank in juxtaposition with the horn, and means coöperating with the horn for forming two interlocking hooks on opposite edges of the blank.

11. In a can-body-forming mechanism, the combination with a rotatable horn, of a blank-feeding mechanism, means for wrapping a blank about the horn, and means coacting with the horn to form successively interlocking members on opposite edges of the blank.

12. In a can-body-forming mechanism, a rotatable horn, a blank-feeding device arranged to present an edge of a blank tangential to the horn, means coöperating with the horn to form a locking member on the edge of the blank so presented, means for folding the blank about the horn and means coöperating with the horn to form a member on the opposite edge of the blank to engage with the aforesaid locking member.

13. In a can-body-forming mechanism, a rotatable horn means for feeding sheets of metal tangentially to said horn and a folding device coöperating with the horn to bend the edges of the sheet to interlock.

14. In a can-body-forming mechanism, a rotatable horn, means for feeding blanks to said horn and a folding device coacting with the horn to form interlocking members successively on the opposite edges of a blank.

15. In a can-body-forming mechanism, a rotatable horn, means for feeding blanks thereto, a reciprocating device coacting with the horn to form interlocking members successively on the blank, and means for giving said horn and reciprocating member a coördinate movement.

16. In a can-body-forming mechanism, a rotatable horn, means for feeding blanks thereto and a single element coacting with the horn to form interlocking members successively on the blank.

17. In a can-body-forming mechanism, a rotatable horn, means for presenting a blank tangentially to the horn and a single folding device coöperating with the horn to form first one hook member on one edge of the blank, and then a complementary interlocking member on the opposite edge of the blank.

18. In a can-body-forming mechanism, a rotatable horn having a peripheral die-recess, means for presenting a blank with one edge in proximity to said recess and a single folding device coöperating with the walls of said recess to form interlocking members successively on opposite edges of the blank.

19. In a can-body-forming mechanism, a rotatable horn having a peripheral die-recess, means for presenting a blank with one edge in proximity to said recess, a single folding device coöperating with the walls of said recess to form interlocking members successively on opposite edges of the blank, and means for giving said horn and said folding device a coordinate movement.

20. In can-body-forming mechanism, a rotatable horn having a peripheral die-recess, means for presenting a blank with one edge in proximity to said recess, and a movable blade coöperating with the walls of said recess to form interlocking members successively on said blank.

21. In can-body-forming mechanism, a rotatable horn having a peripheral die-recess, means for presenting a blank with one edge in proximity to said recess, and a movable blade coöperating with the walls of said recess to form interlocking members successively on said blank, and means for giving said horn and said blade a coördinate movement.

22. In can-body-forming mechanism, a rotatable horn having a peripheral die-recess, means for presenting a blank with one edge in proximity to said recess, a movable blade coöperating with the walls of said recess to form interlocking members successively on said blank, and means for giving said horn and said blade and said blank-feeding means a coördinate movement.

23. In a can-body-forming mechanism, an intermittently-rotatable horn having a peripheral die-recess, a blank-feeding device, a reciprocating blade coacting with the walls of said recess to form interlocking members successively on the blank, and means for giving said several parts a coördinate movement.

24. In can-body-forming mechanism, the combination with a rotatable horn having a peripheral die-recess, of a gage-plate arranged tangentially to the horn, means for rotating the horn intermittently to bring said die-recess proximate to the edge of the gage-plate, means for presenting a blank to the gage-plate and folding means operating intermediate of the said blank-presenting means and said gage-plate to engage the blank and to form interlocking members thereon within the recess.

25. In can-body-forming mechanism, the combination with a rotatable horn having a peripheral die-recess, of a gage-plate arranged tangentially to the horn, means for rotating the horn intermittently to bring said die-recess proximate to the edge of the gage-plate, means for presenting a blank to the gage-plate and folding means operating intermediate of the said blank-presenting means and said gage-plate to engage the blank and to form interlocking members thereon within the recess, said folding means comprising an oscillating blade.

26. In can-body-forming mechanism, the combination with a rotatable horn having a peripheral die-recess, of a gage-plate arranged tangentially to the horn, means for rotating the horn intermittently to bring said die-recess proximate to the edge of the gage-plate, means for presenting a blank to the gage-plate and folding means operating intermediate of the said blank-presenting means and said gage-plate to engage the blank and to form interlocking members thereon within the recess, said folding means comprising an oscillating blade, and means for giving said blade, horn and blank-presenting means a coordinate movement.

In witness whereof I have hereunto set my hand.

JOHN ELDRIDGE.

Witnesses:
G. C. FULTON,
F. L. BISHOP.